United States Patent
Kikuchi

Patent Number: 6,028,475
Date of Patent: Feb. 22, 2000

[54] METHOD AND APPARATUS FOR DEMODULATING MULTI-LEVEL QAM SIGNAL

[75] Inventor: Masahiro Kikuchi, Fukushima, Japan

[73] Assignee: NEC Corporation, Japan

[21] Appl. No.: 09/133,758

[22] Filed: Aug. 12, 1998

[30] Foreign Application Priority Data

Aug. 18, 1997 [JP] Japan ................... 9-221672

[51] Int. Cl.[7] .............. H03D 3/00; H04L 27/38
[52] U.S. Cl. .............. 329/304; 329/310; 375/324; 375/340
[58] Field of Search ................... 329/304–310; 375/261–265, 324, 329–333, 340–343, 346

[56] References Cited

U.S. PATENT DOCUMENTS 5,509,031  4/1996  Johnson et al. ................. 375/262

FOREIGN PATENT DOCUMENTS 1-500636  3/1989  Japan .

Primary Examiner—David Mis
Attorney, Agent, or Firm—Ostrolenk, Faber, Gerb & Soffen, LLP

[57] ABSTRACT

Disclosed is a demodulating apparatus for preventing a reduction in reliability of demodulated data even if a signal point of a multi-level QAM signal is detected, because of influence from fading or noises, in a position where such a signal is not normally existent. To this end, a modulated signal modulated by a multi-level QAM modulation system is orthogonally detected, and analog signals of I and Q channels placed in an orthogonal relationship with each other are outputted. By an identification device, the analog demodulated signals are digitized and then outputted as digital demodulated signals of I and Q channels. If a signal point outside a normal signal point arrangement is detected among the outputs, a digital demodulated signal within a normal signal point arrangement is substituted for the detected signal and then original code data is reproduced.

20 Claims, 7 Drawing Sheets

METHOD AND APPARATUS FOR DEMODULATING MULTI-LEVEL QAM SIGNAL

BACKGROUND OF THE INVENTION

1. Field of the Invention

The present invention relates to an apparatus for demodulating a multi-level QAM (Quadrature Amplitude Modulation) signal, and more particularly to one for orthogonally detecting a multi-level QAM signal, demapping the QAM signal after its digitization and then reproducing original code data.

2. Description of the Related Art

FIG. 8 is a block diagram showing a conventional apparatus for demodulating a multi-level QAM signal. Referring to FIG. 8, the orthogonal detector 1 orthogonally detects a modulated signal Sr modulated by a multi-level QAM modulation system and outputs analog demodulated signals of I and Q channels placed in an orthogonal relationship with each other. The filter 2 performs waveform-shaping of the outputs of the orthogonally detected signal and then outputs analog demodulated signals Si and Sq. The decision device 3 digitizes the analog demodulated signals Si and Sq and outputs these signals as digital demodulated signals D1i and D1q. And the demapping circuit 5 reproduces original code data Di and Dq from the digital demodulated signals D1i and D1q.

The multi-level QAM modulation system has a mapping circuit provided in a transmission side. For transmitting signals, the mapping circuit is disposed and transmits to be optimal in signal space such that a minimum free distance between code words can be maximum. The demapping circuit 5 is provided in a receiving side to perform an operation contrary to that of the mapping circuit in the transmission side. The demapping circuit 5 will be described more in detail later.

Referring to FIG. 9, in which signal point arrangements are shown for 32-level and 64-level QAM signals of a right-angle grid structure. White circles within an inner dotted line indicate a signal point arrangement for 32-level QAM signals. A signal point arrangement of 64-level QAM signals is indicated by black circles arrangement added to the white circles arrangement. The identification device 3 receives analog demodulated signals Si and Sq of I and Q channels arranged in such a signal-point manner, identifies these signals and then outputs digital values corresponding to respective signal points. In other words, as shown in FIG. 9, preset threshold levels L1, L2 and L3 are compared with each other concerning I and Q channels, high and low levels are identified and divided into 8 sections each, whereby digital demodulated signals D1i and D1q of bits I1, I2 and I3 and bits Q1, Q2 and Q3 are respectively outputted.

In the case of 32-level QAM signals as in the case of 64-level QAM signals, the identification device in which levels must be identified and divided into 8 sections of I and Q channels respectively. When 32-level QAM signals are affected by fading or noises in a transmission section and, as a result, signal points are positioned outside the dotted line shown in FIG. 9 and thus shifted from a normal signal point arrangement, signals of signal points that are not normally existent may be identified and detected by the identification device. If such data regarding the signal outside the dotted line is detected by the identification device and outputted to the demapping device, the demapping circuit cannot normally reproduce original code data and thus outputs indefinite data. A bit error then occurs and, consequently, reliability of demodulated data may be reduced.

The above phenomenon also occurs in the case of 128-level QAM signals. In FIG. 10, signal point arrangements for 128-level and 256-level QAM signals are shown. For convenience, only a first quadrant is shown. Also in FIG. 10, white circles within a dotted line indicate a signal point arrangement for 128-level QAM signals. For I and Q channels, in the first quadrant, an identification device for identifying levels and dividing the levels into 8 sections is required. Accordingly, by using the identification device, a signal point arrangement for 256-level QAM signals is also detected, the 256-level QAM signals being indicated by black circles outside the signal point arrangement for the 128-level QAM signals.

Thus, when a signal is shifted from a normal signal point arrangement, data regarding the signal outside the dotted line is also detected by the identification device and outputted to the demapping circuit. Consequently, a problem of demodulating indefinite data occurs similarly.

A similar problem occurs for a signal point arrangement of multi-level QAM signals of a honeycomb structure which is disclosed in JP(A) 1-500636 (1989). Specifically, for a signal point arrangement of a honeycomb structure shown in FIG. 11, since signal points exist to be detected outside a normal signal arrangement surrounded by a dotted line within a conversion input signal range of analog demodulated signals of I and Q channels, bit errors also occur.

SUMMARY OF THE INVENTION

It is an object of the present invention to provide an apparatus for demodulating a multi-level QAM signal, which can prevent a reduction in reliability of demodulated data even if signal points of multi-level QAM signals are detected, because of influence from fading or noises, in positions where these signal points are not normally existent.

According to the present invention, a multi-level QAM signal demodulating apparatus for orthogonally detecting a multi-level QAM (Quadrature Amplitude Modulation) signal, demapping this QAM signal after its digitization and then reproducing original code data comprises substituting means for substituting, when a digital demodulated signal of a signal point shifted from a normal signal point arrangement for multi-level QAM signals is detected, the digital demodulated signal of a signal point within the normal signal point arrangement for the detected signal.

Specifically, the substituting means includes a detection circuit for detecting the digital demodulated signal of the signal point outside the normal arrangement, a storage circuit for storing a substitution pattern beforehand, the substitution pattern being used for substituting, for the detected demodulated signal, a digital demodulated signal of a signal point within the arrangement shortest from the signal point outside the arrangement, and a circuit for selecting, upon receiving a detecting result of the detection circuit, the digital demodulated signal of the signal point within the arrangement based on the substitution pattern. Alternatively, the substituting means includes a detection circuit for detecting the digital demodulated signal of the signal point outside the arrangement, and a combinational logical circuit for producing, upon receiving a detecting result of the detecting circuit, the digital demodulated signal of the signal point within the arrangement. Otherwise, the substituting means includes ROM where data regarding digital demodulated signal after substitution is written beforehand by using the digital demodulated signal outputted from the digital conversion means as an address.

BRIEF DESCRIPTION OF THE DRAWINGS

For a more complete understanding of the present invention and the advantages thereof, reference is now made to the following detailed description taken in conjunction with the accompanying drawings, in which.

DETAILED DESCRIPTION OF THE PREFERRED EMBODIMENTS

The present invention will be described with reference to the accompanying drawings.

Figure 1:
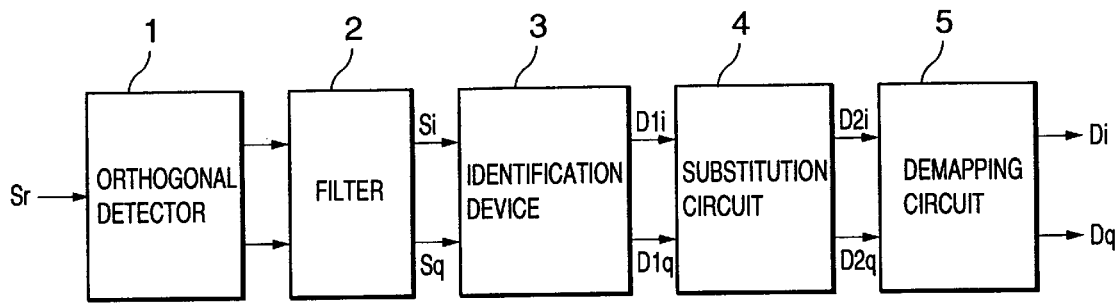
FIG. 1 is a block diagram showing an embodiment of the present invention.
Figure 8:
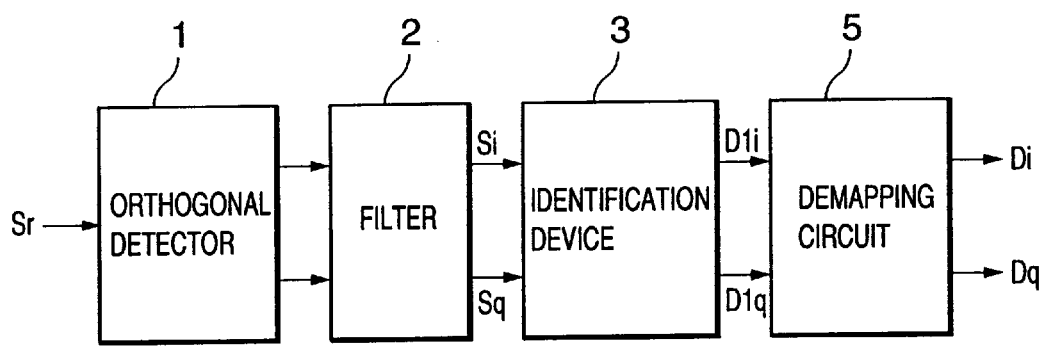
FIG. 8 is a block diagram showing a conventional apparatus for demodulating a multi-level QAM signal.

FIG. 1 is a block diagram showing a first embodiment of the present invention, where like reference numerals denote corresponding constituting elements of the conventional example shown in FIG. 8.

In FIG. 1, an orthogonal detector 1 orthogonally detects a modulated signal Sr modulated by a multi-level QAM modulation system and outputs analog demodulated signals of I and Q channels placed in an orthogonal relationship with each other. The filter 2 performs waveform-shaping of the outputs of orthogonal detection and outputs analog demodulated signals Si and Sq. The identification device 3 digitizes the analog demodulated signals Si and Sq and outputs these signals as digital demodulated signals D1i and D1q of I and Q channels. The substitution circuit 4 substitutes, when digital demodulated signals D1i and D1q of signal points outside a normal signal point arrangement for a multi-level QAM signal, digital demodulated signals D1i and D1q of signal points within the normal signal point arrangement for the detected demodulated signals. The demapping circuit 5 reproduces original code data D2i and D2q from digital demodulated signals outputted from the substitution circuit 4.

A signal point arrangement for a multi-level QAM signal is uniquely decided by the modulation system. Accordingly, whether demodulated and detected signal points are within the normal signal point arrangement or not can be easily determined. When a signal of a signal point outside the normal signal point arrangement is detected, by substituting a signal within the normal signal point arrangement which is in the shortest distance from the signal point for the detected signal, outputting of indefinite data can be prevented during demapping.

Figure 2:
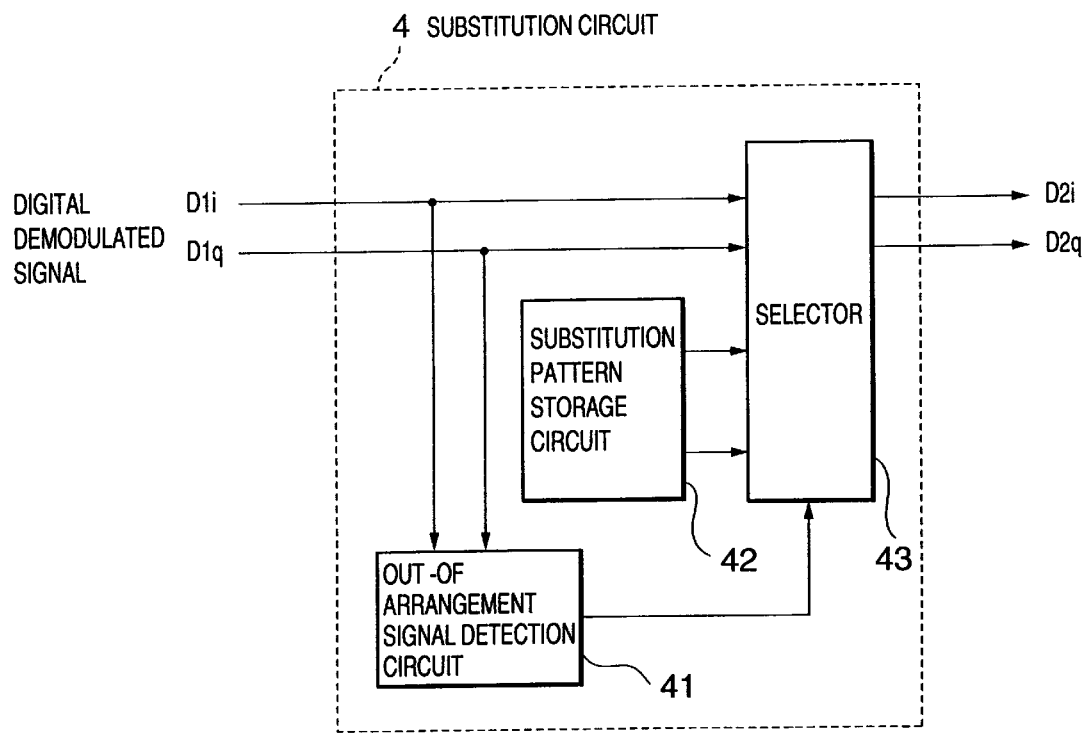
FIG. 2 is a block diagram showing a first embodiment of a substitution circuit 4.

FIG. 2 is a block diagram showing a first embodiment of the substitution circuit 4.

The out-of arrangement signal detection circuit 41 receives the digital demodulated signals D1i and D1q outputted from the identification device 3 and detects a digital demodulated signal of a signal point outside the normal signal point arrangement. The substitution pattern storage circuit 42 stores a substitution pattern beforehand for substituting a digital demodulated signal of a signal point within the normal signal point arrangement for the digital demodulated signal of the signal point outside the normal signal point arrangement. The selector 43 substitutes, when the out-of arrangement signal detection circuit 41 detects an out-of arrangement signal, a within arrangement signal for the out-of arrangement signal based on the substitution pattern stored beforehand in the substitution pattern storage circuit 42, and then outputs digital demodulated signals D2i and D2q.

Figure 3:
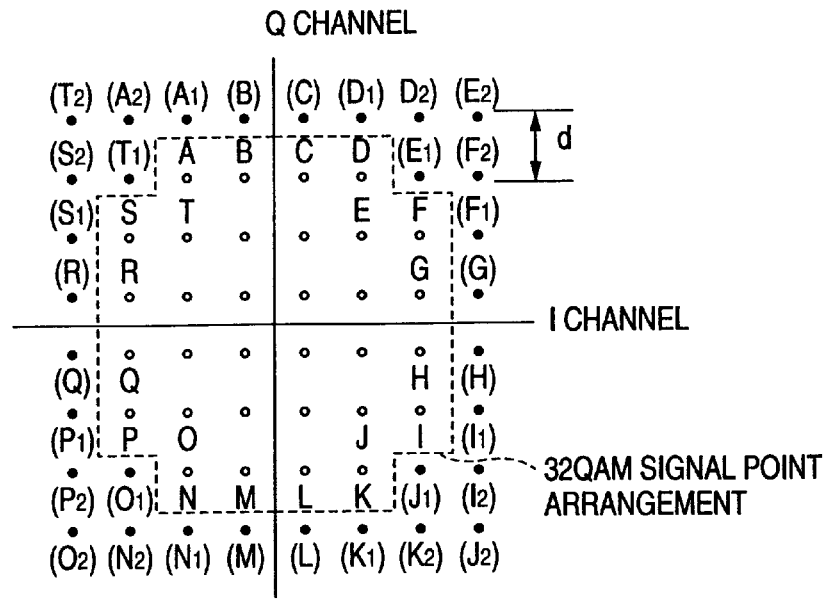
FIG. 3 is a view showing an example of a substitution pattern for a 32-level QAM signal.

FIG. 3 shows an example of a substitution pattern for a 32-level QAM signal. Herein, normal signal points are indicated by alphabets while out-of arrangement signal points are indicated by bracketed alphabets. When out-of arrangement signal point is detected, a normal signal point which is in the shortest distance from the out-of arrangement signal is substituted for the same. For example, signal points A within the arrangement are substituted for out-of arrangement signal points (A1) and (A2), and signal points F within the arrangement are substituted for two signal points (F1) and (F2) outside the arrangement.

A specific substitution method for signal points outside the normal arrangement detected in the receiving side will be described below.

A cause of mistaken signal point determination during QAM demodulation may be attributed to fluctuation in amplitude level or a shift in carrier wave synchronous phase. In the former case, signal points are moved radially from a center point of an orthogonal coordinate. In the latter case, signal points are moved on places equidistant (i.e., circle) from the center point of the orthogonal coordinate. Since mistakenly determined signal points are arranged outside normal signal points, any points on the outer circumference of the normal signal points may have been mistaken.

Thus, in principle, the substitution method substitutes, for a signal point outside the normal arrangement, a signal point which is in the shortest distance therefrom in a center direction of an orthogonal axis. Reference is now made to FIG. 3. If a distance between signal points adjacent to each other in parallel with I, Q and CH axial directions is d, then a distance between signal points (A1) and A is d, a distance between signal points (A1) and B is $\sqrt{2} \times d$ and thus the distance with A is shortest. Therefore, the signal point A is substituted for the signal point (A1).

Next, if distances are equal to a plurality of signal points A and S as in the case of signal points (T1) and (T2), determination is made as follows.

For the signal point (T1), signal points A and S exist where a distance is shortest, and a signal point T exists in the center direction of the orthogonal axis. Consequently, use of only the above deciding method is not enough for determination. Thus, the number of errors when the signal point A is substituted for the signal point (T1) is considered.

It is assumed herein that an error between signal points adjacent to each other in parallel with the axis is 1 bit.

No errors when an original signal point is A.
1 bit error when an original signal point is T.
2 bit error when an original signal point is S.

$$\text{Average error number}=(0+1+2)/3=1 \text{ bit} \quad (1)$$

If the signal point S is substituted for the signal point (T1), the following result is obtained.

$$\text{Average error number}=(2+1+0)/3=1 \text{ bit} \quad (2)$$

If the signal point T is substituted for the signal point (T1), the following result is obtained.
1 bit error when an original signal point is A.
No errors when an original signal point is T.
1 bit error when an original signal point is S.

$$\text{Average error number}=(1+0+1)/3=2/3 \text{ bit} \quad (3)$$

As can be understood from the above expressions (1) to (3), the average error number is smallest when the signal point T is substituted for the signal point (T1).

As described above, in principle, the substitution method substitutes, for a signal point outside the arrangement, a signal point within the arrangement which is in the shortest distance therefrom in the center direction of an orthogonal axis. If a plurality of signal points of the shortest distance exist, average error numbers are calculated for the respective signal points of the shortest distance and a signal point having the smallest average error number is substituted for a signal point outside the arrangement. FIG. 3 shows an arrangement view when all out-of arrangement signal points (A1) to (T2) are decided by the substitution method.

Figure 11:
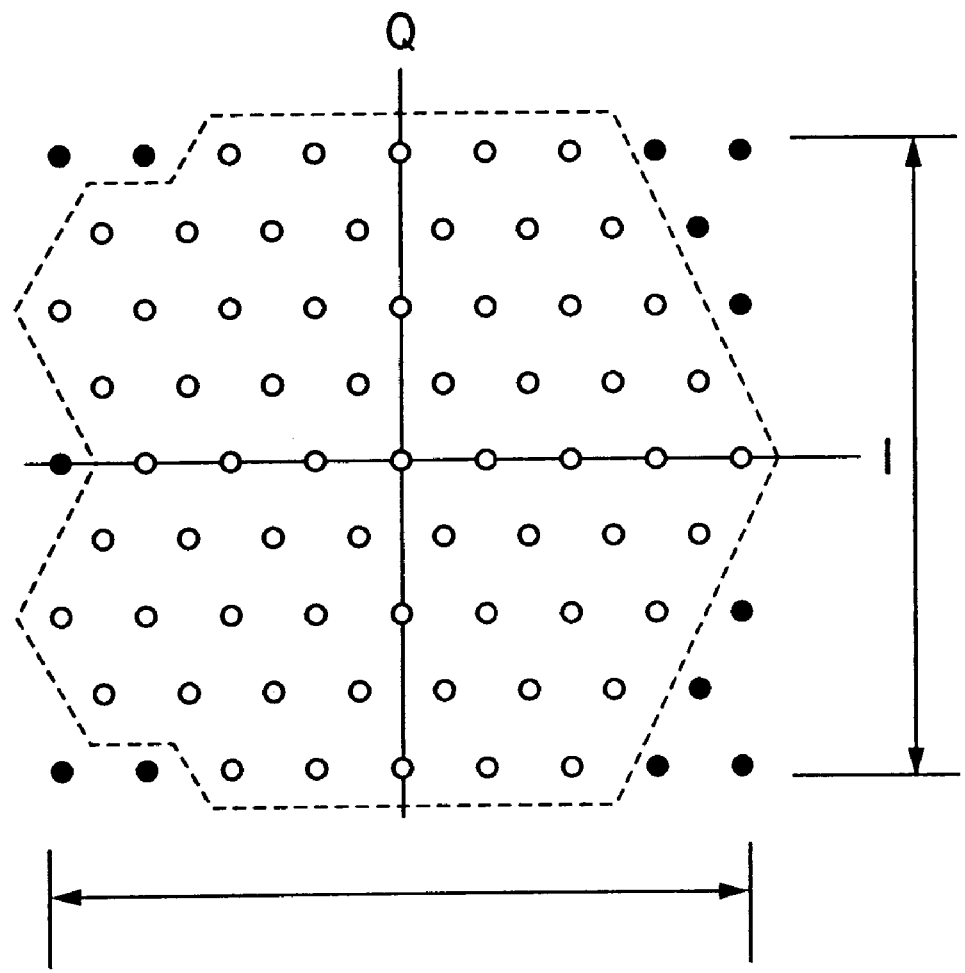
FIG. 11 is a view showing signal point arrangements of a honeycomb structure.

Next, a substitution method for arranged signal points of a honeycomb structure of FIG. 11 will be described.

Figure 4:
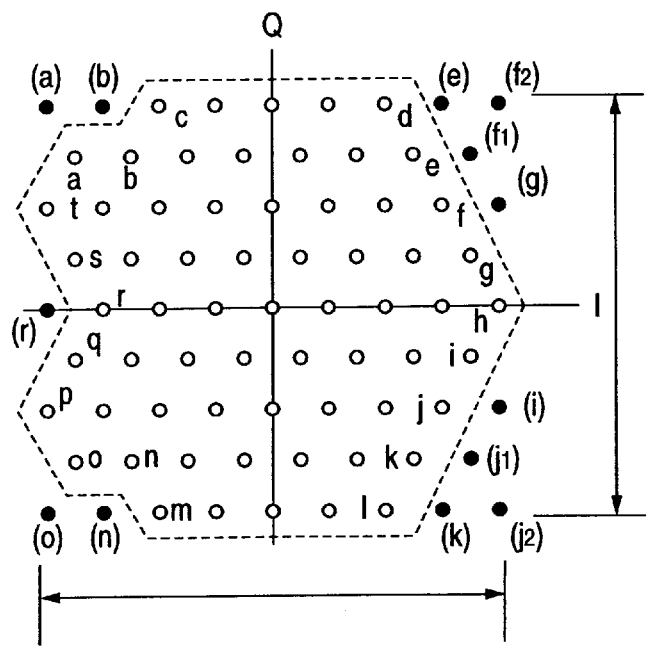
FIG. 4 is a view showing an example of a signal substitution pattern of a honeycomb structure.

FIG. 4 shows an example of a signal substitution pattern of the honeycomb structure. Normal signal points are indicated by alphabets while signal points outside the arrangement are indicated by bracketed alphabets.

In the arranged signal points of the honeycomb structure, for example, the out-of arrangement signal point (e) of a first quadrant is located in a distance equal to those of within arrangement signal points d and e. Likewise, the signal point (f1) is located in a distance equal to those of signal points f and e, and the signal point (g) is located in a distance equal to those of signal points f and g. The signal point (f2) is located in a distance equal to those of signal points d and f. Thus, since almost all equidistant signal point arrangements have 2 points or more, signal points are substituted such that a difference in distance from the center point of the orthogonal axis can be minimum. As a result, for the out-of arrangement signal point (e), comparison of distances between the within arrangement signal points d and e shows that the signal point e is smaller. Accordingly, the within arrangement signal point e is substituted for the out-of arrangement signal point (e).

Figure 5:
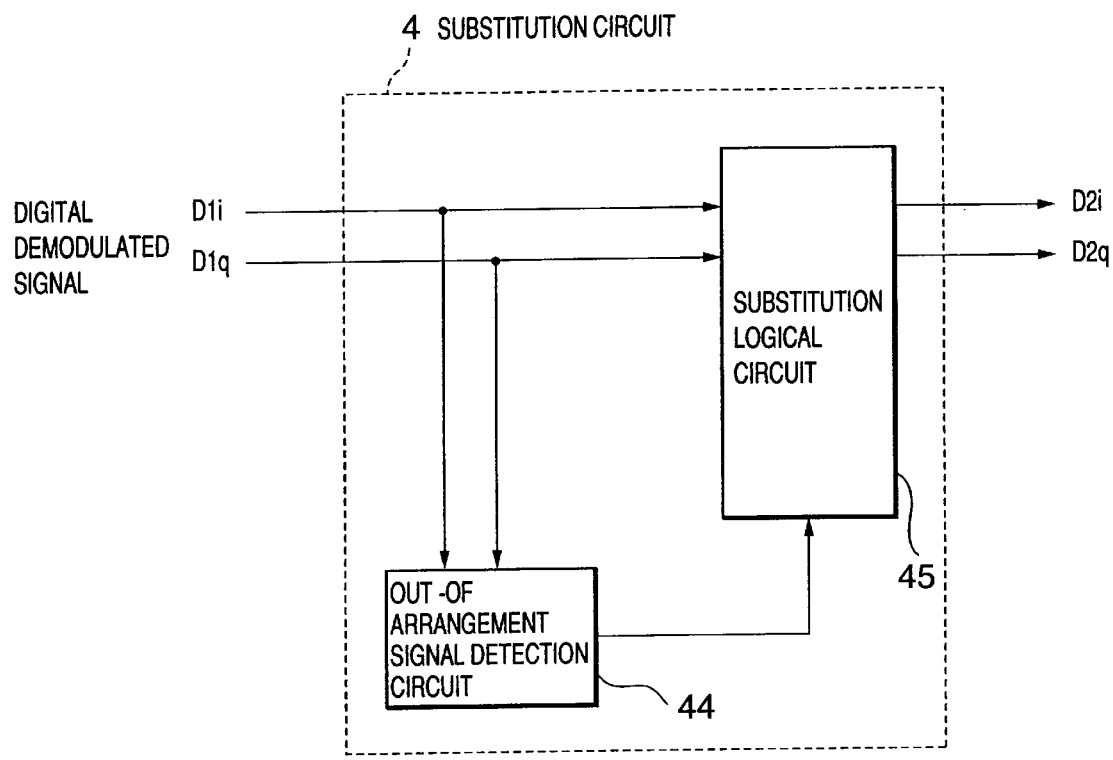
FIG. 5 is a view showing a second embodiment of the substitution circuit 4.

For the other signal points, similar substitution is carried out by using the above method. As a result, as shown in FIG. 4, substitution can be performed for all the out-of arrangement signal points (a), (b), (e), (f1), (f2), (g), (i), (j1), (j2), (k), (n), (o) and (r). FIG. 5 is a view showing a second embodiment of the substitution circuit 4.

In FIG. 5, the out-of arrangement signal detection circuit 44 receives digital demodulated signals D1i and D1q outputted from the identification device 3 and detects a signal outside the normal signal arrangement. The substitution logical circuit 45 includes a combinational logical circuit for receiving a detection signal from the out-of arrangement signal detection circuit 44 and substituting a predetermined digital demodulated signal within arrangement signal for a digital demodulated signal of an out-of arrangement signal point.

Figure 6:
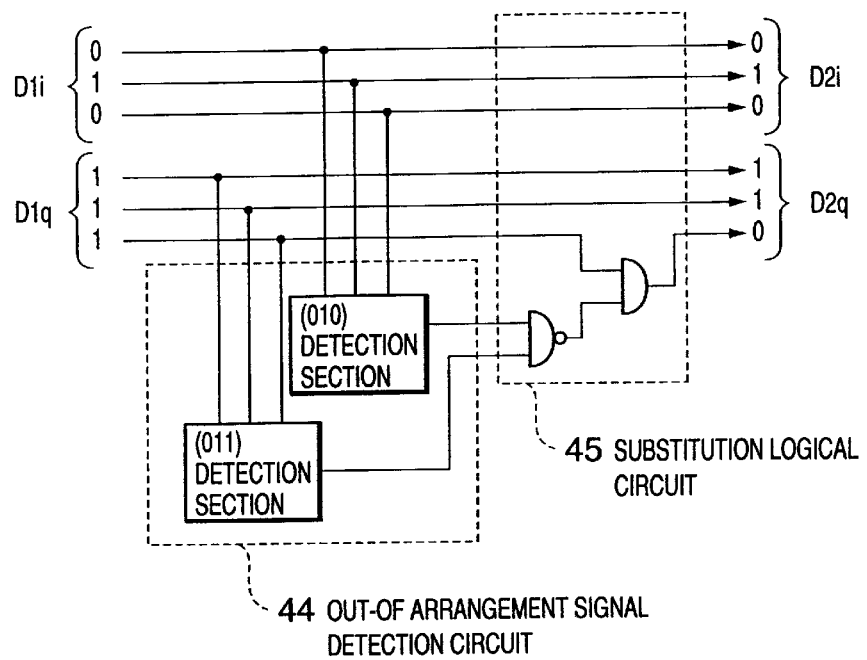
FIG. 6 is a view showing an example of a circuit configuration for substituting a digital demodulated signal of a signal point within an arrangement for a digital demodulated signal of a signal point outside the arrangement.
Figure 9:
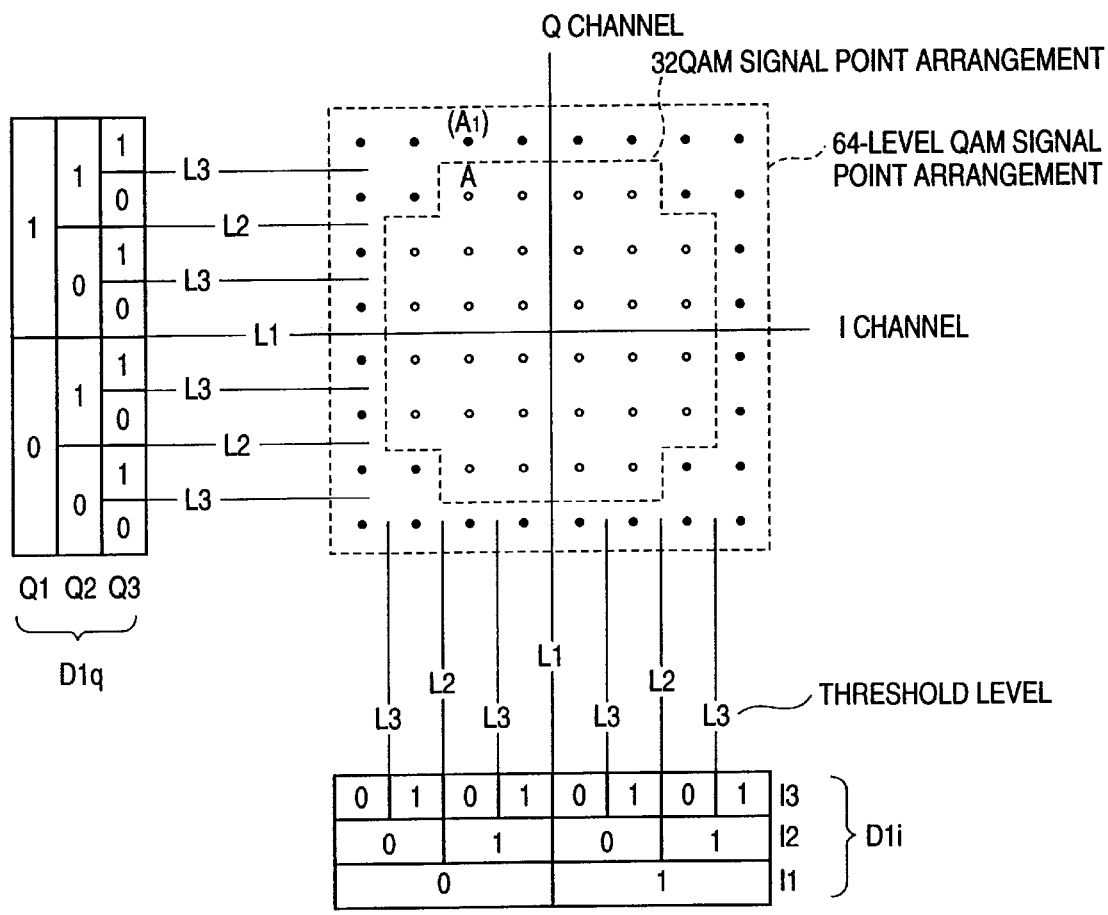
FIG. 9 is a view showing signal point arrangements for 32-level and 64-level QAM signals of a right-angle grid structure.
Figure 10:
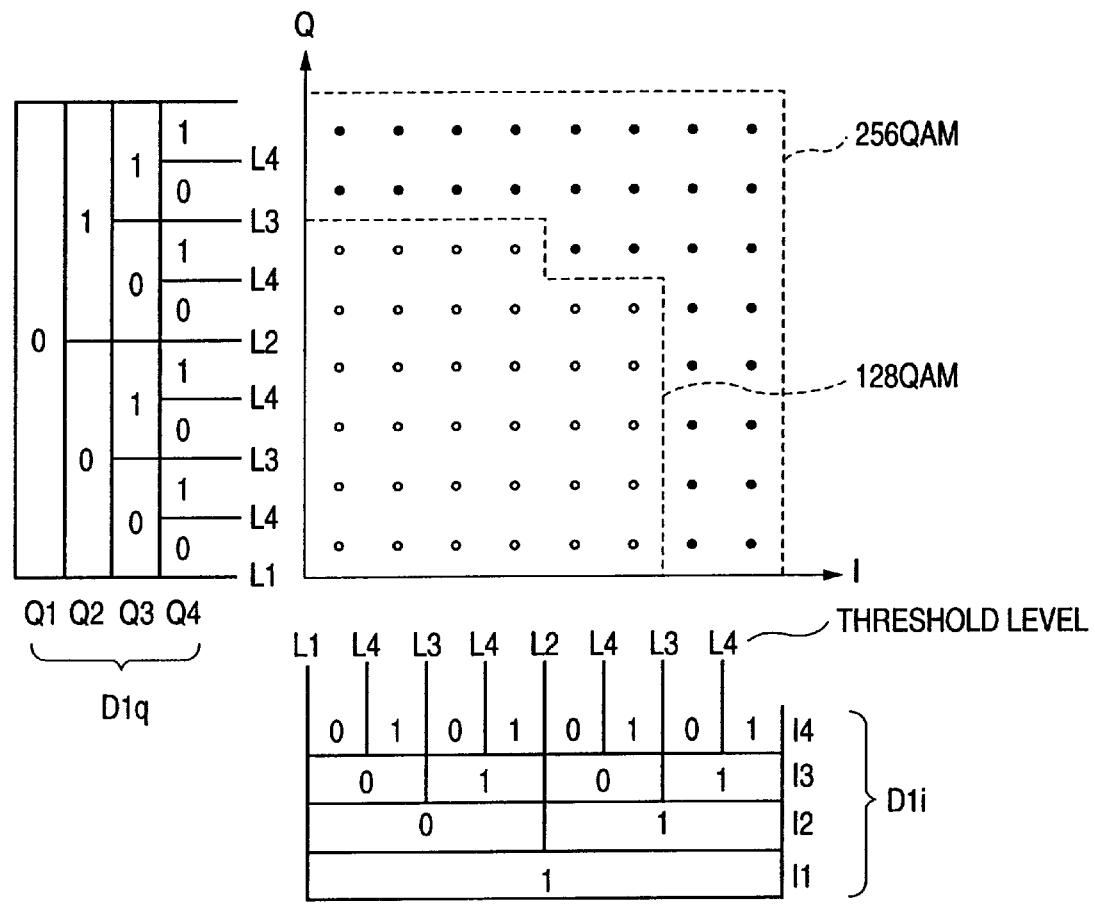
FIG. 10 is a view showing signal point arrangements for 128-level and 256-level QAM signals.

FIG. 6 shows an example of a circuit configuration for substituting a digital demodulated signal within arrangement signal point A for a digital demodulated signal detected at an out-of arrangement signal point (A) shown in FIG. 9. In this case, I and Q channel digital demodulated signals of an out-of arrangement signal point (A1) outputted from the identification device 3 are D1i="010" and D1q="111" as shown in FIG. 9.

A "010" detection section of the out-of arrangement signal detection circuit 44 outputs "1" when a digital demodulated signal D1i of I channel is "010". Its "111" detection section outputs "1" when a digital demodulated signal D1q of Q channel is "111". Upon receiving a detection signal from the out-of arrangement signal detection circuit 44, the substitution logical circuit 45 outputs digital demodulated signals D2i="010" and D2q="110" within arrangement signal point A. The out-of arrangement signal detection circuit 44 and the substitution logical circuit 45 are configured to deal with all the out-of arrangement signal points (A1) to (T2) shown in FIG. 3. Thus, according to the second embodiment, the combinational logical circuit is configured so as to decide out-of arrangement and within arrangement signals by using the substitution pattern described above with reference to FIG. 3, digital-demodulate a signal of each signal point, convert the signal for logical level reading and then realize its logical level.

Figure 7:
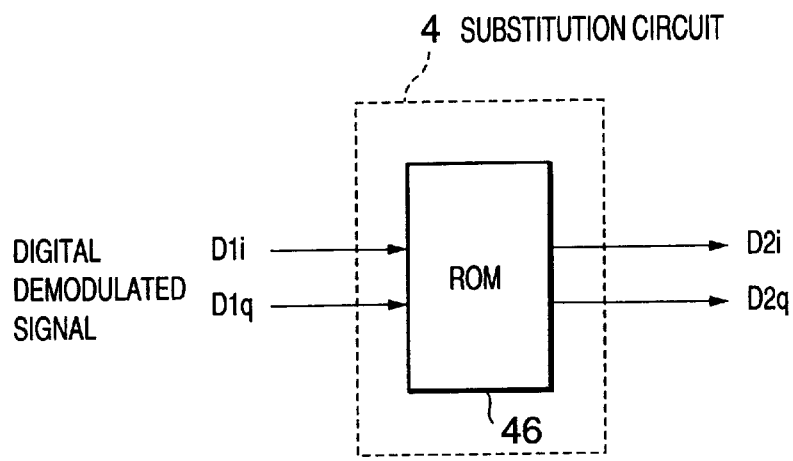
FIG. 7 is a view showing a third embodiment of the substitution circuit 4.

FIG. 7 shows a third embodiment of the substitution circuit 4 which is configured by using ROM 46.

In ROM 46, the data of digital demodulated signals D2i and D2q after substitution is written beforehand by using digital demodulated signals D1i and D1q as addresses. For example, based on a substitution pattern like that shown in FIG. 3, substitution data regarding a corresponding to a signal point within arrangement is read when an out-of arrangement signal point is addressed, and the same data is read when the signal point within arrangement is addressed.

In the above description, a 32-level QAM signal of the right-angle grid structure was taken as an example. However, the same can apply to a 128-level QAM signal of the right-angle grid structure. In other words, the present invention can generally apply to 22N+1-level QAM signals (N is an integer of 1 or higher). Also, for a structure other than the right-angle grid structure, for example, in the case of a multi-level QAM signal of a honeycomb structure, similar substitution processing can be performed. As apparent from the foregoing, according to the present invention, even if a multi-level QAM signal is affected by fading or noises in a transmission section and a signal of a signal point that is not normally existent is detected by the identification device, the demapping circuit is unable to output indefinite data by substituting a signal of a normally existent signal point for the detected signal and outputting this signal to the demapping circuit. Accordingly, reliability of demodulated data can be increased and the occurrence of bit errors can be prevented.

Although the preferred embodiment of the present invention has been described in detail, it should be understood that various changes, substitutions and alternation can be made therein without departing from spirit and scope of the inventions as defined by the appended claims.

What is claimed is:

1. An apparatus for demodulating a multi-level QAM (Quadrature Amplitude Modulation) modulation signal comprising:

orthogonal detecting means for orthogonally detecting a multi-level QAM signal and outputting analog demodulated signals placed in an orthogonal relationship with each other;

digitizing means for digitizing said analog demodulated signals and outputting digital demodulated signals;

substituting means for substituting a digital demodulated signal of a signal point within a normal signal point arrangement of said multi-level QAM signal for said digital demodulated signal of a signal point outside said normal signal point arrangement; and means for demapping said digital demodulated signals and reproducing original code data.

2. The apparatus of claim 1, wherein said substituting means includes a detection circuit for detecting said digital demodulated signal of the signal point outside the arrangement, a storage circuit for storing a substitution pattern beforehand, said substitution pattern being used for substituting said digital demodulated signal of the signal point within the arrangement for said digital demodulated signal of the signal point outside the arrangement, and a circuit for selecting, upon receiving a detecting result of said detection circuit, said digital demodulated signal of the signal point within the arrangement based on said substitution pattern.

3. The apparatus of claim 2, wherein said substitution pattern is used for substituting, for said digital demodulated signal of the signal point outside the arrangement, a digital demodulated signal of a signal point within the arrangement which is in the shortest distance from the signal point outside the arrangement.

4. The apparatus of claim 2, wherein said substitution pattern is used, if there are a plurality of signal points within the arrangement which is in the shortest distance from the signal point outside the arrangement in a center direction of an orthogonal axis, for substituting a signal point making minimum an average error number of respective signal point.

5. The apparatus of claim 1, wherein said substituting means includes a detection circuit for detecting said digital demodulated signal of the signal point outside the arrangement, and a combinational logical circuit for producing, upon receiving a detecting result of said detection circuit, said digital demodulated signal of the signal point within the arrangement.

6. The apparatus of claim 5, wherein said signal point outside the arrangement is a signal point substituted for by said signal point within the arrangement which is in the shortest distance in a center direction of an orthogonal axis.

7. The apparatus of claim 6, wherein said signal point outside the arrangement is, if there are a plurality of signal points within the arrangement which is in the shortest distance in the center direction of the orthogonal axis, the signal point substituted for by a signal point making minimum an average error number of respective signal point.

8. The apparatus of claim 1, wherein said substituting means includes ROM written data beforehand regarding a digital demodulated signal after substitution by using a digital demodulated signal outputted from said digitizing means as an address.

9. The apparatus of claim 8, wherein said substitution processing is for substituting a digital demodulated signal of a signal point within the arrangement which is in the shortest distance from said signal point outside the arrangement.

10. The apparatus of claim 9, wherein said substitution is for substituting, if there are a plurality of signal points within the arrangement which are in the shortest distance from said signal point outside the arrangement in a center direction of an orthogonal axis, a signal point making minimum an average error number of respective signal point for the signal point.

11. The apparatus of claim 1, further comprising filter means for performing waveform-shaping of an output of said orthogonal detecting means.

12. The apparatus of claim 1, wherein for said multi-level QAM signal, a signal point arrangement is a right-angle grid structure and the number of its signal points is 22N+1 (N: an integer of 1 or higher).

13. The apparatus of claim 1, wherein for said multi-level QAM signal, a signal point arrangement is a non-right-angle grid structure.

14. The apparatus of claim 13, wherein for said multi-level QAM signal, a signal point arrangement is a honeycomb structure.

15. A method for demodulating a multi-level QAM (Quadrature Amplitude Modulation) modulation signal, said method comprising the steps of:

orthogonally detecting a multi-level QAM signal and outputting analog demodulated signals placed in an orthogonal relationship with each other;

digitizing said analog demodulated signals and outputting digital demodulated signals;

substituting a digital demodulated signal of a signal point within a normal signal point arrangement of said multi-level QAM signal for said digital demodulated signal of a signal point outside the arrangement; and demapping said digital demodulated signal and reproducing original code data.

16. The method of claim 15, wherein said substituting step includes detecting said digital demodulated signal of the signal point outside the arrangement, storing a substitution pattern beforehand for substituting said digital demodulated signal of the signal point within the arrangement for said digital demodulated signal of the signal point outside the arrangement, and selecting, upon receiving a detecting result of a detection circuit, said digital demodulated signal of the signal point within the arrangement based on said substitution pattern.

17. The method of claim 16, wherein said substitution pattern is used for substituting a digital demodulated signal of a signal point within the arrangement which is in the shortest distance from said signal point outside the arrangement.

18. The method of claim 16, wherein said substitution pattern is used for substituting, if there are a plurality of signal points within the arrangement shortest from said signal point outside the arrangement in a center direction of an orthogonal axis, a signal point making minimum an average error number of respective signal point.

19. The method of claim 15, wherein said substituting step includes detecting said digital demodulated signal of the signal point outside the arrangement by a first combinational logical circuit, and producing, upon receiving a detecting result of said detection circuit, the digital demodulated signal of the signal point within the arrangement by a second combinational logical circuit.

20. The method of claim 15, wherein said substituting step includes inputting said digital demodulated signal outputted from said digital conversion means to ROM and outputting data written beforehand regarding a digital demodulated signal after substitution.

* * * * *